3,495,078
APPARATUS FOR SYNCHRONIZING
SYNCHRO DATA
Robert L. James, Bloomfield, and Harold Moreines, Springfield, N.J., assignors to The Bendix Corporation, a corporation of Delaware
Filed June 22, 1967, Ser. No. 648,157
Int. Cl. G06g 7/22, 7/26; G06f 15/34
U.S. Cl. 235—189         7 Claims

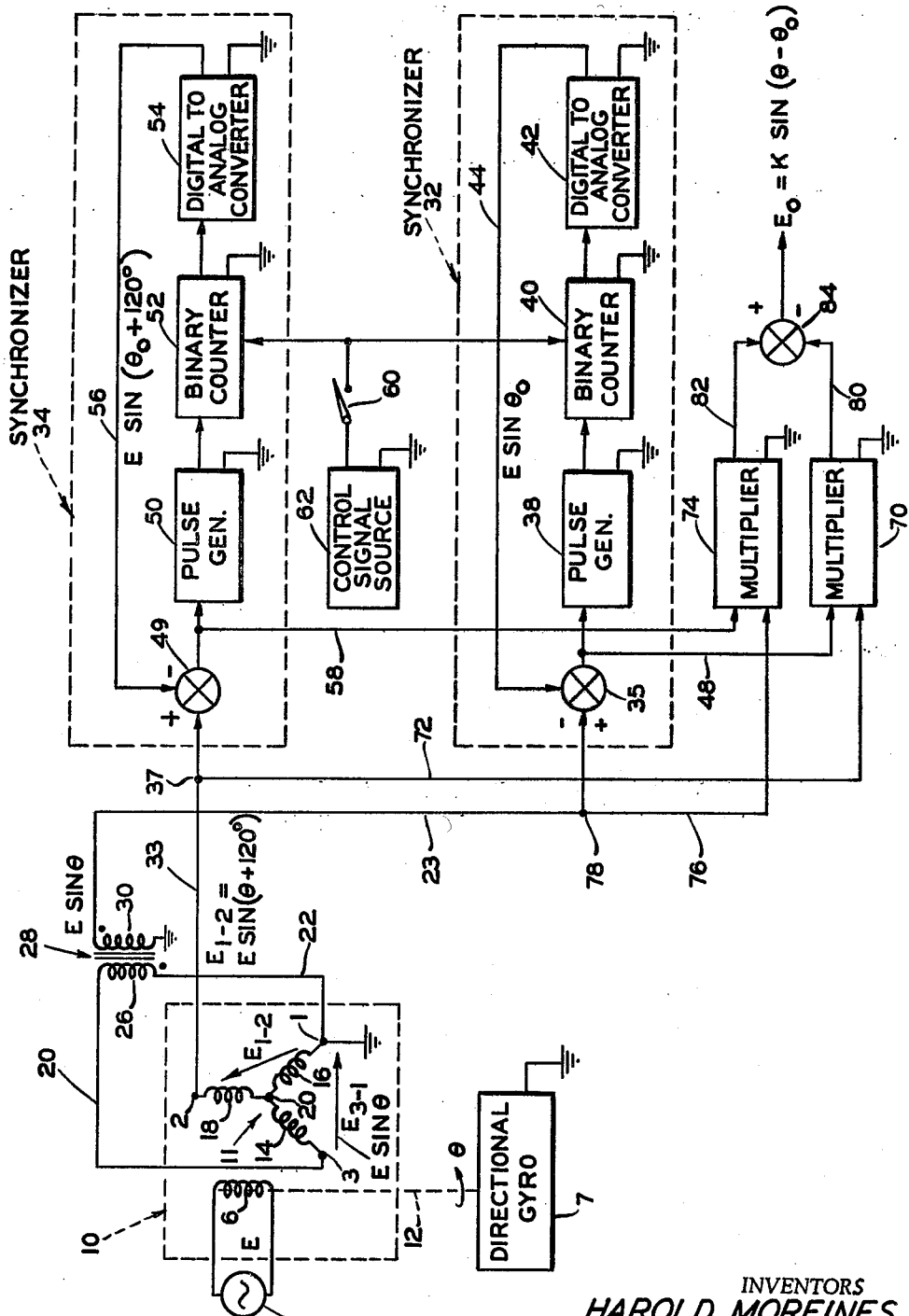

ABSTRACT OF THE DISCLOSURE

Apparatus for synchronizing signals provided by a signal device including an input winding carried by an angularly displaceable element and an output winding having three equiangular spaced coils. One of the coils is grounded and signals are provided corresponding to the sine of the angular displacement in response to a condition and corresponding to the sine of said angular displacement and the angle between the coils. The signals are applied to corresponding synchronizers and the output of each synchronizer is multiplied by the input to the other synchronizer. The multiplied outputs are subtracted for providing a synchronized output as a function of the difference between angular displacement of the element in response to a condition and angular displacement at a predetermined synchronizing instant.

CROSS REFERENCE TO RELATED APPLICATIONS

The present invention employs a digital synchronizer such as that disclosed and claimed in copending U.S. application Ser. No. 558,327, filed June 17, 1966, by Robert L. James and assigned to The Bendix Corporation, assignee of the present invention.

BACKGROUND OF THE INVENTION

Field of the invention

This invention relates to synchronizing modulated carrier signals such as may be used in automatic flight control systems and, more particularly, to synchronizing signals such as generated at the stator leads of a synchro transmitter and which signals are periodic with respect to the angular orientation of the stator coils.

Description of the prior art

Heretofore, electro-mechanical synchronizers were used to synchronize flight control system input signals. In order to achieve advantages with respect to weight, space, and reliability, solid state digital synchronizers such as the synchronizer described and claimed in the aforenoted copending U.S. application Ser. No. 558,327, were developed. However, these synchronizers were designed for two wire systems and direct application to synchro systems having three output coils involves ambiguities. Thus, application of the digital synchronizer to any one of the three coils provides a synchronized signal ($E_0'$) as follows:

$$E_0' = E \sin(\theta + \phi) - E \sin(\theta_0 + \phi) \quad (1)$$

where:

$\theta$ = angular displacement of the synchro rotor in response to a condition.
$\theta_0$ = angular displacement of synchro rotor at a predetermined synchronizing instant.
$\phi$ = relative angular orientation of the stator coil.

The synchronizer output gradient is as follows:

$$dE_0'/d\theta = E \cos(\theta + \phi) \quad (2)$$

The output gradient at the synchronizing instant ($\theta = \theta_0$) is as follows:

$$dE_0'/d\theta = E \cos(\theta_0 + \phi) \quad (3)$$

Equation 3 illustrates that the aforementioned ambiguities depend upon angular displacement of the synchro rotor at the synchronizing instant ($\theta_0$) and the particular coil used as represented by angle ($\phi$).

SUMMARY OF THE INVENTION

The device of the present invention provides a synchronized output in the form $E_0 = K \sin(\theta - \theta_0)$. The output gradient is as follows:

$$dE_0/d\theta = K \cos(\theta - \theta_0) \quad (4)$$

The output gradient at the synchronizing instant ($\theta = \theta_0$) is as follows:

$$dE_0/d\theta = K \cos 0° = K \quad (5)$$

Equation 5 illustrates that the gradient, at the synchronizing instant, is a constant K, independent of $\theta$ and $\phi$, and thus the aforenoted ambiguities are avoided.

The invention contemplates a signal device having an angularly displaceable input element energized by a source of alternating current for providing at an output element having three equiangularly spaced coils a signal corresponding to the sine of the angular displacement of the input element in response to a condition and a signal corresponding to the sine of said angular displacement and the angle between the coils. A signal corresponding to the sine of the angular displacement at a predetermined synchronizing instant and a signal corresponding to the sine of said last mentioned angular displacement and the angle between the coils are provided in response to the signals from the signal device. A synchronized signal is provided in response to the last mentioned signals and to the signals from the signal device which corresponds to the sine of the difference between the angular displacement in response to the condition and the angular displacement at the synchronizing instant.

One object of this invention is to provide a device having weight, space and reliability advantages for synchronizing signals from a three-wire synchro transmitter.

Another object of this invention is to synchronize said signals to provide a constant error gradient about any preselected reference point so that the synchronized signal is free of ambiguities.

Another object of this invention is to employ apparatus of the type used for synchronizing non-periodic two-wire signals for synchronizing periodic three-wire signals so as to resolve ambiguities.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

The single figure in the drawing shows apparatus for synchronizing signals provided by a three-wire synchro transmitter and embodying the present invention.

With reference to the figure there is shown a synchro transmitter 10 having a rotor 12 angularly displaced by a condition sensor such as a directional gyro 7 and carrying a winding 6, and which winding 6 is energized by a voltage E from a suitable source of alternating current 8. The synchro 10 includes a stator 11 having windings 14, 16 and 18 spaced 120 degrees apart and connected at a common terminal 20. The winding 14 has an output terminal 3, the winding 16 has a grounded output terminal 1 and the winding 18 has an output terminal 2. The arrangement is such that when the rotor 12 is displaced through an angle $\theta$, a signal $E \sin \theta$, as represented by the vector $E_{3-1}$, is provided at the output terminal 1 and a signal $E \sin (\theta+120°)$ as represented by the vector $E_{1-2}$, is provided at the output terminal 2.

A conductor 20 leading from output terminal 3 is connected to one leg of a primary winding 26 of a unity gain reversing transformer 28 and a conductor 22 leading from grounded terminal 1 is connected to the other leg of the primary winding 26. A conductor 33 leading from the output terminal 2 is connected to a synchronizer 34. The transformer 28 has a secondary winding 30 inductively coupled to the primary winding 26 and which secondary winding 30 has one leg connected through a conductor 23 to a synchronizer 32 and the other leg connected to ground. The arrangement is such that the reversing transformer 28 provides at the conductor 23 a signal $E \sin \theta$ and which signal $E \sin \theta$ is in a sense opposite to the signal $E \sin \theta$ represented by the vector $E_{3-1}$.

The synchronizer 32 is of the type disclosed and claimed in the aforenoted copending U.S. application Ser. No. 558,327 and includes a pulse generator 38 which modulates the signal from transformer 28 applied through a summation device 35 and provides pulses having a frequency corresponding to the amplitude of the signal. The pulses are applied to a binary counter 40 which counts the pulses and provides a digital output corresponding to the total number of pulses generated in a predetermined interval, and the digital output is applied to a digital to analog converter 42 which converts the digital output to an analog output. The analog output is applied through a feedback conductor 44 to the summation means 35 and is combined thereat with the signal from transformer 28 in a sense so as to provide a null output at a synchronizer output conductor 48.

The synchronizer 34 is of a type similar to the synchronizer 32 and includes a pulse generator 50 which modulates the signal from output terminal 2 applied through a summation device 49 and provides pulses havaing a frequency corresponding to the amplitude of the signal, a binary counter 52 which counts the pulses and provides a digital output corresponding to the total number of pulses generated in the predetermined interval and a digital to analog converter 54 which converts the digital output to an analog output. The analog output is applied through a feedback conductor 56 to summation means 49 and combined thereat with the signal from output terminal 2 in a sense so as to provide a null output at a synchronizer output conductor 58.

At some predetermined synchronizing instant, which may, for purposes of example, correspond to a preselected flight condition, a switch 60 is manually or automatically closed to apply a signal from a control signal source 62 to the counters 40 and 52 whereby the counters are inhibited from counting. At this synchronizing instant and thereafter until the switch 60 is opened, the output applied to summation means 35 through the feedback conductor 44 corresponds in amplitude to $E \sin \theta_0$, and the output applied to the summation means 49 through the feedback conductor 56 corresponds in amplitude to $E \sin (\theta_0+120°)$, where $\theta_0$ is the angular displacement of the synchro rotor 12 at the synchronizing instant. Thus, error signals are provided at the synchronizer output conductors 48 and 58 corresponding to the difference between the signals from transformer 28 and converter 42, and corresponding to the difference between the signals from terminal 2 and converter 54, respectively.

The synchronizer output conductor 48 is connected to an electronic multiplier 70 and the conductor 33 leading from output terminal 2 of synchro stator 11 is connected to the multiplier 70 through a conductor 72 joining the conductor 33 at a point 37. The synchronizer output conductor 58 is connected to an electronic multiplier 74 and the secondary winding 30 of the transformer 28 is connected to the multiplier 74 through the conductor 23 and through a conductor 76 joining the conductor 23 at a point 78. The multipliers 70 and 74 may be of the type described in "Electromechanical Design," April 1965, published by Benwill Publishing Corporation, and wherein said multipliers 70 and 74 are responsive to the inputs thereto for providing at output conductors 80 and 82 outputs corresponding to the product of the respective inputs. Thus, the signal at the output conductor 80 corresponds to $$K'[E \sin (\theta+120°)][E \sin \theta - E \sin \theta_0]$$

and the signal at the output conductor 82 corresponds to $$K'[E \sin \theta][E \sin (\theta+120°) - E \sin (\theta_0+120°)]$$

where $K'$ is a system transfer constant.

The output conductors 80 and 82 are connected to a summation means 84 which substracts the signals and provides a synchronized output $E_0 = K \sin (\theta-\theta_0)$ as will be analytically shown.

OPERATION

The operation of the device of the present invention may best be illustrated by mathematically analyzing the function of the structural elements described herein.

Thus, synchro stator 11 provides at the output terminal 1 signal $E \sin \theta$ and provides at the output terminal 2 signal $E \sin (\theta+120°)$. The latter signal may be more conveniently expressed for purposes of later analysis as $E \cos (\theta+30°)$ in accordance with the trigonometric identity $\sin (x+90°) = \cos x$, where $x = \theta+30°$. Summation means 35 sums the signal at terminal 1 applied through transformer 28 and the feedback signal applied through conductor 44 providing at the conductor 48 signal $E \sin \theta - E \sin \theta_0$. Summation means 49 sums the signal at terminal 2 and the feedback signal applied through conductor 56 providing at the conductor 58 signal $E \cos (\theta+30°) - E \cos (\theta_0+30°)$. Multiplier 70 provides in response to the signal from summation means 35 and in response to the signal from terminal 2 a signal as follows:

$$K'[E \cos (\theta+30°)][E \sin \theta - E \sin \theta_0]$$

Multiplier 74 provides in response to the signal from summation means 49 and in response to the signal from transformer 28 a signal as follows:

$$K'[E \sin \theta][E \cos (\theta+30°) - E \cos (\theta_0+30°)]$$

Summation means 84 subtracts signals from multipliers 70 and 74 providing a synchronized signal $E_0$ as follows:

$$E_0 = K'[E \sin \theta - E \sin \theta_0][E \cos (\theta+30°)]$$
$$- K'[E \sin \theta][E \cos (\theta+30°) - E \cos (\theta_0+30°)]$$

Appropriate substitution of trigonometric identities provides an expression for $E_0$ as follows:

$$E_0 = K'E^2 \frac{\sqrt{3}}{2} [\sin \theta \cos \theta_0 - \sin \theta_0 \cos \theta]$$

$$E_0 = K'E^2 \frac{\sqrt{3}}{2} \sin (\theta - \theta_0)$$

$$E_0 = K \sin (\theta - \theta_0) \qquad (6)$$

The synchronized output represented by Equation 6 and provided in accordance with the invention is free of ambiguities and provides a constant error gradient about any preselected reference. Moreover, this result is achieved with distinct advantages regarding weight space and reliability since the apparatus is particularly adaptable for construction with solid state components.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A synchronizer comprising:
   a signal device having an angularly displaceable input element connected to a voltage source and energized thereby and an output element inductively connected to the input element, and having three equiangularly spaced coils for providing a signal corresponding in amplitude to the sine of the angular displacement of the input element in response to a condition and for providing a signal corresponding to the sine of said angular displacement and the angle between the coils;
   synchronizing means connected to the signal device and responsive to the signals provided at the output element thereof for providing a signal corresponding to the sine of the angular displacement of the input element at a predetermined synchronizing instant and for providing a signal corresponding to the sine of said last mentioned angular displacement and the angle between the coils;
   a first multiplier connected to the signal device and to the synchronizing means and responsive to the signal corresponding to the sine of the angular displacement of the input element in response to a condition and responsive to the signal corresponding to the sine of the angular displacement at the predetermined synchronizing instant and the angle between the coils for providing a signal corresponding to the product of said signals;
   a second multiplier connected to the signal device and to the synchronizing means and responsive to the signal corresponding to the sine of the angular displacement in response to a condition and the angle between the coils and responsive to the signal corresponding to the sine of the angular displacement at the predetermined synchronizing instant for providing a signal corresponding to the product of said signals; and means connected to the first and second multipliers and responsive to the signals therefrom for providing a synchronized signal corresponding to the sine of the difference between the angular displacement of the input element in response to the condition and the angular displacement at the synchronizing instant.

2. A synchronizer as described by claim 1 wherein the synchronizing means connected to the signal device and responsive to the signals provided at the output element thereof for providing a signal corresponding to the sine of the angular displacement of the input element at a predetermined synchronizing instant and for providing a signal corresponding to the sine of said last mentioned angular displacement and the angle between the coils comprises:
   first means connected to the signal device and responsive to the signal corresponding to the sine of the angular displacement in response to a condition for providing a signal equal and opposite to said signal;
   second means connected to the signal device and responsive to the signal corresponding to the sine of the angular displacement in response to a condition and the angle between the coils for providing a signal equal and opposite to said signal; and
   control means connected to the first and second means and operable at the predetermined synchronizing instant for rendering the first means effective for providing the signal corresponding to the sine of the angular displacement at the predetermined synchronizing instant and for rendering the second means effective for providing the signal corresponding to the sine of said last mentioned angular displacement and the angle between the coils.

3. A synchronizer as described by claim 2, wherein:
   said three equiangular spaced coils are connected to a common terminal and each coil has an output terminal;
   one of said output terminals is grounded so that the output element provides across said grounded terminal and another of the output terminals and in a predetermined sense the signal corresponding to the sine of the angular displacement of the input element in response to a condition; and
   the output element provides across the grounded output terminal and the third of the output terminals and in a predetermined sense the signal corresponding to the sine of the angular displacement of the input element in response to a condition and the angle between the coils.

4. A synchronizer as described by claim 3 including:
   a reversing transformer connected to the grounded output terminal and to the other output terminal for providing a signal corresponding in amplitude to the signal provided across said terminals and in a sense opposite to said signal;
   the transformer being connected to the first means; and
   the third of the output terminals being connected to the second means.

5. A synchronizer as described by claim 4, wherein:
   the first means includes a pulse generator connected to the transformer and responsive to the signal therefrom for providing pulses having a frequency corresponding in amplitude to said signal;
   the second means includes a pulse generator connected to the third of the output terminals and responsive to the signal therefrom for providing pulses having a frequency corresponding in amplitude to said signal; and
   the first and second means each include a counter connected to the pulse generator included therein for counting the pulses and for providing a digital output corresponding to the total number of said pulses generated in a predetermined interval and a converter connected to the counter for converting the digital output to an analog output.

6. A synchronizer as described by claim 5, wherein:
   the first means includes summation means connected to the transformer and connected to the converter included in the first means for summing the signals therefrom;
   the second means includes summation means connected to the third of the output terminals and to the converter included in the second means for summing the signals therefrom; and
   the first multiplier is connected to the summation means included in the first means and the second multiplier is connected to the summation means included in the second means.

7. A synchronizer as described by claim 1, wherein:
   the three equiangularly spaced coils are spaced 120 degrees apart for providing the signal corresponding in amplitude to the sine of the angular displacement of the input element in response to a condition and for providing a signal corresponding to the sine of said angular displacement plus 120 degrees.

References Cited
UNITED STATES PATENTS

| | | | |
|---|---|---|---|
| 2,979,662 | 4/1961 | Farrow | 328—139 |
| 3,068,467 | 12/1962 | Grimaila. | |
| 3,117,222 | 1/1964 | Zdan | 235—197 |
| 3,187,169 | 6/1965 | Trammell et al. | 235—189 |
| 3,375,508 | 3/1968 | Molnar et al. | 340—198 |

MALCOLM A. MORRISON, Primary Examiner

R. W. WEIG, Assistant Examiner

U.S. Cl. X.R.

235—197; 328—133; 340—198